G. E. GUNTHER.
GARDEN TRACTOR.
APPLICATION FILED DEC. 27, 1919.
1,389,945.
Patented Sept. 6, 1921.
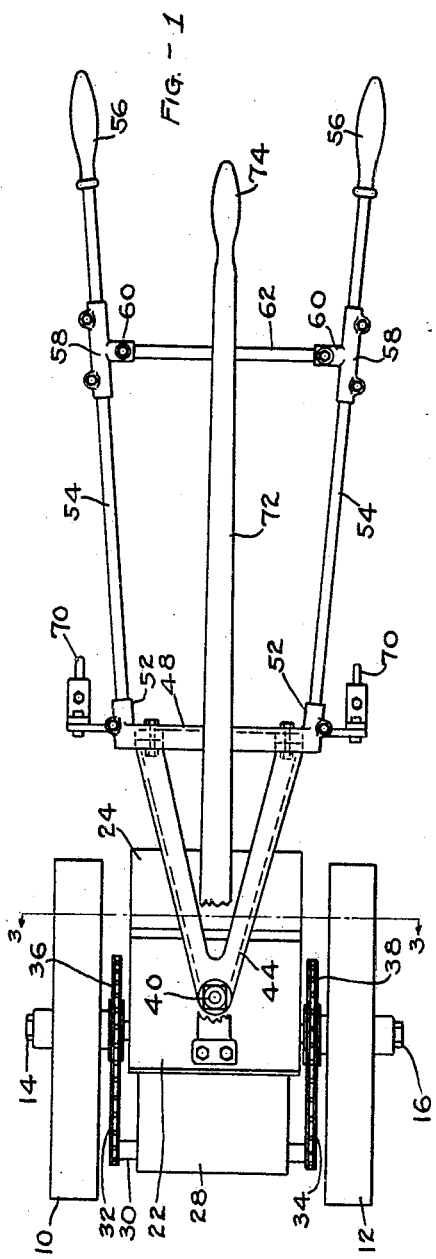
INVENTOR:
GEORGE E. GUNTHER.
BY Whiteley and Ruckman
ATTORNEYS.

UNITED STATES PATENT OFFICE.

GEORGE E. GUNTHER, OF ST. PAUL, MINNESOTA.

GARDEN-TRACTOR.

1,389,945.                Specification of Letters Patent.     Patented Sept. 6, 1921.

Application filed December 27, 1919. Serial No. 347,750.

*To all whom it may concern:*

Be it known that I, GEORGE E. GUNTHER, a citizen of the United States, residing at St. Paul, in the county of Ramsey and State of Minnesota, have invented certain new and useful Improvements in Garden-Tractors, of which the following is a specification.

My invention relates to garden tractor steering mechanism and an object is to provide a mechanism of this character by means of which the tractor may be readily and easily steered with a minimum amount of effort on the part of the operator. Another object is to provide steering mechanism which may be operated to control the direction of travel of the tractor with such a degree of precision that when the tractor is used for example in cultivating growing crops the cultivator teeth may be caused to operate close to the plants without danger of digging up the same.

The full objects and advantages of my invention will appear in connection with the detailed description thereof and the novel features embodied in my inventive idea will be particularly pointed out in the claims.

In the accompanying drawings which illustrate the application of my invention in one form,—

Figure 1 is a top plan view. Fig. 2 is view in side elevation with certain parts in section and one of the driving wheels removed. Fig. 3 is a view substantially on the line 3—3 of Fig. 1 looking in the direction of the arrows.

Referring to the particular construction shown in the drawings, 10 and 12 designate driving wheels mounted on stub shafts 14 and 16 which are carried by brackets 18 and 20 depending from a main support 22 which comprises a casing containing a water jacket for the engine. Supported on this casing are a fuel tank 24, a motor or engine 26, and a transmission casing 28, the latter having a shaft 30 extending transversely therethrough and driven in well known manner by the engine. Upon the ends of the shaft 30 are secured sprocket wheels which are connected by chains 32 and 34 to sprocket wheels 36 and 38 secured to the hubs of the driving wheels 10 and 12. The support 22 is pivotally attached at 40 and 42 to the vertices of V-shaped upper and lower members 44 and 46 respectively, the branches of which diverge rearwardly and at the rear ends are attached to transverse bars 48 which are connected by vertical bars 50. The upper transverse bar is provided with sockets 52 in which are secured the forward ends of handle members 54 provided at their rear ends with hand engaging portions 56. Socketed members 58 are secured around the handle members 54 intermediate their ends. The socketed members 58 are provided with sockets 60 for receiving the ends of a transverse rod 62 and are also provided with downwardly inclined sockets 64 to receive the upper ends of diagonal brace rods 66, the lower ends of which are received in sockets 68. A truss frame or auxiliary support is thus formed which at its lower side may carry suitable implements such as cultivator teeth 70 which may be used either with or without gage wheels. A longitudinal bar 72 is rigidly attached at its forward end to the support or casing 22 and at its rear end is provided with a hand engaging portion 74 which is within easy reach of the operator.

The operation of my steering mechanism will be readily understood from the foregoing description. When the tractor is being moved along by the driving wheels 10 and 12, the direction of travel may be quickly changed by the operator. When he exerts force to move the hand engaging portion 74 toward the left the tractor is caused to swerve toward the right and vice versa. This movement may be controlled with a high degree of precision. The pivotal attachment of the casing or support 22 at 40 and 42 permits this swerving motion to occur readily upon the application of a small amount of force by the operator, this force being transmitted to the support 22 upon which the driving wheels are mounted so that they swing toward the right or left in unison with said support.

I claim:

1. A garden tractor comprising a support, a motor mounted thereon, a pair of driving wheels upon which said support is mounted, driving connections between said motor and said driving wheels, an implement frame to which said support is pivoted at its top and bottom so as to be capable of swinging horizontally with relation to said implement frame, and a handle member rigidly attached to said support and extending rearwardly whereby the operator may guide the tractor.

2. A garden tractor comprising a support, a motor mounted thereon, a pair of driving wheels upon which said support is mounted, driving connections between said motor and said driving wheels, an implement frame to which said support is pivoted at its top and bottom, so as to be capable of swinging horizontally with relation to said implement frame, the vertical line of the top and bottom pivots extending close to the horizontal line connecting the centers of said driving wheels, and a handle member rigidly attached to said support and extending rearwardly whereby the operator may guide the tractor.

3. A garden tractor comprising a support, a motor mounted thereon, a pair of driving wheels upon which said support is mounted, driving connections between said motor and said driving wheels, upper and lower horizontal V-shaped members constituting part of an implement frame and to the vertices of which said support is pivoted at its top and bottom respectively, so as to be capable of swinging horizontally with relation to the implement frame, a pair of handle members extending rearwardly from said upper V-shaped member, and a handle member rigidly attached to said support and extending rearwardly whereby the operator may guide the tractor.

In testimony whereof I hereunto affix my signature.

GEORGE E. GUNTHER.